Patented Nov. 6, 1934

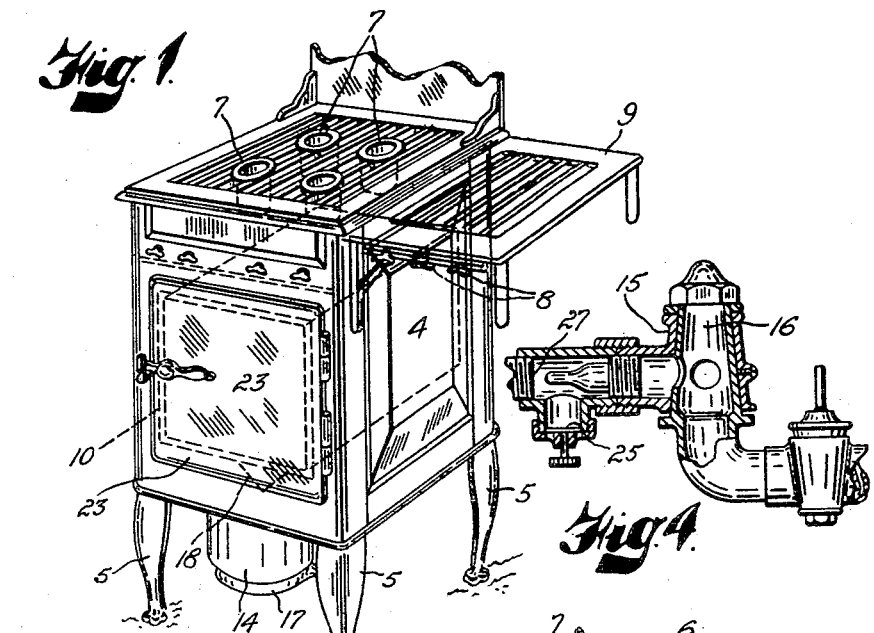

1,980,060

UNITED STATES PATENT OFFICE 1,980,060

COOKING STOVE

James Dowson Jackson, Artarmon, near Sydney, New South Wales, Australia

Application November 26, 1931, Serial No. 577,404
In Australia November 26, 1930

1 Claim. (Cl. 126—39)

This invention relates to improvements in flueless gas fired cooking stoves which do not require a discharge flue and has particular reference to stoves of this nature having a hot air jacket surrounding the oven thereof.

An object of the present invention is to devise a gas fired stove wherein the products of combustion may be prevented from coming in contact with the food in the oven.

A further object of the invention is to devise a gas fired stove wherein the products of combustion and heated air may be induced to pass round an oven portion from a burner disposed outside, and below the said oven, and whereby an even heat is maintained after the oven has been heated.

According to the present invention the stove has an outer shell, and may have a hot plate as its top member with flues therein to receive pots, kettles, and the like, and fitted with suitable burners.

Inside the shell I mount one or more ovens according to the size of the stove desired. The ovens are positioned to leave a space between their side and rear walls, and the walls of the shell, and thereby produce a hot air space. The bottom of the oven is also spaced above the bottom of the shell. Legs are provided to support the shell at a distance above the floor level.

In some cases a set of cooking burners may be provided at the side of the shell of the stove instead of on top thereof, in accordance with general practice.

The front of the shell is provided with a door or doors which communicate with the oven or ovens. The lower surface or bottom of the oven is inclined downwardly or has a conical deflector mounted to leave an annular opening leading into the oven and whereby heated gases may be admitted to the oven in the preliminary stages of heating. The annular opening is adapted to be closed by a plate when it is desired to direct the hot gases around the oven in a non-contact manner. By removing the plate the oven can be used when only a very low pressure of gas is available.

A flue, which is preferably cylindrical, communicates with the space beneath the oven and is disposed beneath the conical deflector. The flue has situated, immediately below it, a gas burner preferably of the well known ring type, which is mounted upon a swivel to facilitate lighting. The burner may also be provided with means for admitting air thereto. The top of the shell of the stove is provided with an orifice as a protection in the event of an escape of gas occurring in the flue at the base of the stove.

In order that the invention may be more readily understood, reference will now be made to the accompanying drawing wherein:—

Figure 1 is a perspective view of the invention.

Figure 2 is a perspective sectional view showing the internal construction of the stove.

Figure 3 illustrates diagrammatically two ovens disposed one above the other.

Figure 4 illustrates on an enlarged scale and in sectional elevation, a suitable swivel fitting for the burner.

Figure 5 is a detail sectional perspective, on a larger scale, of the conical reflector and associated parts.

The stove has an outer shell 4 which may be lagged if desired, and is supported upon legs 5. The hot plate 6 has cylindrical openings or flues 7 wherein pots may be inserted. Each of the cylindrical openings 7 is disposed above a burner 3 controlled by a suitable tap. If desired a set of cooking burners controlled by taps 8 may be provided in an extension top member 9 shown by broken lines in Figure 1.

An oven 10 is mounted centrally in the shell 4 so as to leave a space 11 between their respective walls. This space 11 is termed a hot jacket. If desired two or more ovens may be mounted in the shell 4 as indicated by the numerals 12 and 13 in Figure 3.

The bottom of the oven 10, Figure 2, has an opening in which is supported a concial deflector 18 which projects downwardly towards a flue 14. The deflector 18 is supported by arms 19 which leave an annular space 20 adapted to be covered by a plate 21.

The flue 14 has situated immediately below it a burner 17 which is preferably of the well known ring type, and is mounted upon a swivel fitting 15 which turns upon a plug 16 in the manner indicated in detail in Figure 4 and wherein a rotary valve 25 is shown for admitting air to the burner tube 27.

Suitable lugs or brackets 22 are provided to support shelves in the oven which is closed by a door 23.

To heat the oven quickly, the plate 21 is removed and the products of combustion and heated air pass from the burner 17 into the oven. After the oven has been heated, the plate 21 is replaced, whereupon the hot gases are deflected by the deflector 18 into the hot jacket or space 11 between the oven 10 and the shell 4, and it will be noted, do not now come into contact with the food in the oven. It has been found by extensive tests made by leading gas authorities that an exhaust flue is not necessary with this invention; however, for safety purposes, in the event that the gas to the burner 17 has been turned on and not lighted, an orifice 24 has been provided, for instance, in the top of the shell 4 to allow of the escape of gas from the jacket space 11.

I claim:

A cooking stove of the class described, comprising a shell having a small aperture in its top to allow extraneous combustible gas to escape therefrom, an oven in said shell of such size and so disposed as to provide a confined space around the oven and between the walls of the latter and of the shell for passage of heating gases, a flue at the bottom of the shell for conducting the heating gases into the said confined space, a pivotally mounted gas burner situated immediately below said flue and arranged to be swung away therefrom, and a conical deflector depending below an aperture in the base of the oven and directly above the gas burner, for distributing the heating gases from the burner throughout the said confined space, the base of said deflector being surrounded by an annular space adapted to admit heating gases to the interior of the oven and a closure plate adapted to fit in the said aperture in the base of the oven.

JAMES DOWSON JACKSON.